Jan. 26, 1937.　　　R. R. DUNLOP　　　2,068,666
CUTTER CHAIN
Original Filed June 19, 1934
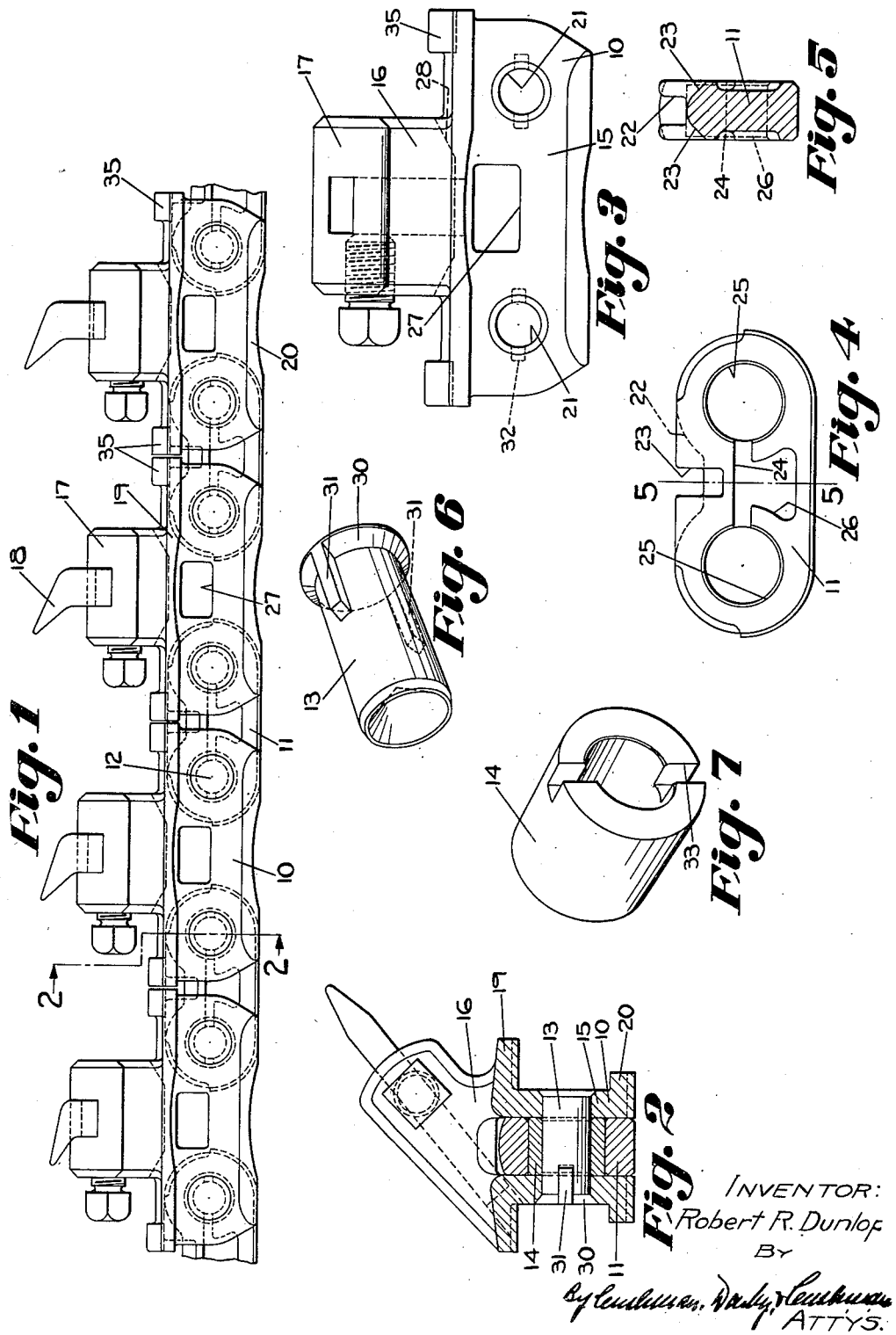
INVENTOR:
Robert R. Dunlop
BY
Cushman, Darby, Cushman
ATTYS.

Patented Jan. 26, 1937

2,068,666

UNITED STATES PATENT OFFICE 2,068,666

CUTTER CHAIN

Robert R. Dunlop, Columbus, Ohio, assignor to The Jeffrey Manufacturing Company, a corporation of Ohio Application June 19, 1934, Serial No. 731,378
Renewed February 27, 1936

6 Claims. (Cl. 262—33)

The present invention relates to a cutter chain particularly adapted for use on mining machines.

Objects of the invention are, to provide a structure for connecting the links of the chain in such a way that wear may be minimized and the links will be securely held together; and, further, to provide a link of such structure that mined slack will not accumulate in the chain.

Other objects and advantages of the invention will appear from the following specification and drawing.

In the drawing:

Figure 1 is an elevation of a portion of the cutter chain;

Figure 2 is a transverse sectional view taken on the line 2—2 of Figure 1;

Figure 3 is a side elevation of one of the bit-carrying links of the chain;

Figure 4 is a side elevation of one of the connecting links;

Figure 5 is a transverse sectional view taken on the line 5—5 of Figure 4;

Figure 6 is a perspective view of the pintle structure used to couple adjacent links of the chain; and Figure 7 is a perspective view of a sleeve or bushing included in the pintle structure.

The chain is formed of bit-carrying links 10 and alternate connecting links 11, the links being coupled by means of pintle structures generally indicated by the numeral 12 and each of which comprises a pin 13 and a sleeve or bushing 14.

The bit-carrying links 10 are of the bridged type and include side bars 15 joined by a bridging portion 16 which has a bit-carrying lug 17 formed integrally therewith and in which a bit 18 may be suitably secured. The side bars 15 of the bit-carrying links are provided at their ends adjacent the bridging portion with flanges 19 adapted to bear upon the outer edges of the slide plates of a cutter bar. The opposite or free ends of the side bars include gibs 20 adapted to engage in grooves in the cutter bar to hold the chain in the cutter bar.

The side bars of the bit-carrying links 10 have aligned apertures 21 adjacent each end thereof, which apertures are adapted to be placed in registry with apertures in the connecting links to permit the links to be coupled by the pintle structure 12.

The connecting links 11 are positioned between adjacent bit-carrying links and are of well known construction except that, as shown in Figures 4 and 5, each link has, in its outer surface, that is, its surface distant from the cutter bar, a groove 22 from which open transverse slots 23. By this arrangement, slack or fines may move through the groove and slots to drop from the chain. Longitudinally extending grooves 24 are provided on the upper and lower faces of the connecting links, these grooves extending between the pintle receiving apertures 25 provided adjacent each end of the link. The groove 24 may have an enlargement or slot extending therefrom as shown at 26 to provide freer movement for slack from the link. The bit-carrying links 10 have apertures 27 in their side bars and also apertures 28 in their bridging portions to permit movement of slack from the links.

The pin 13 of the pintle structure includes a head 30 having longitudinally extending keys 31 extending therefrom along a portion of the length of the pin, the keys 31 preferably being positioned diametrically opposite each other. The keys 31 are intended to extend into key-ways 32 in the apertures 21 of the bit-carrying links and are sufficiently long to also extend into slots or kerfs 33 provided at one end of the sleeve 14 which, as shown in Figure 2, surrounds the portion of the pin 13 which is positioned within the connecting link 11. It will be noted from this that the keys 31 on the pin will prevent the pin from turning with respect to the bit-carrying link and will also hold the sleeve 14 from turning. The end of the pin 13 opposite from its head 30 may be riveted over to prevent the pin from being displaced.

By the pintle structure described above, any strain at the point of coupling will be taken by the connecting link or the pintle structure. In the event of serious wear, it will only be necessary to replace either the connecting links or parts of the pintle structure rather than the more expensive bit-carrying link. The present arrangement also permits the pintle structure to be of maximum diameter, thereby greatly increasing the life of this structure and the elements of the chain which contact therewith.

It will be noted that the bit-carrying links 10 are provided with shoulders 35 at each end thereof which, when the chain is coupled, are in close proximity. If one of the bit-carrying links should tend to tilt by reason of contact of its bit with a hard body of coal, this tilting action will be resisted by reason of contact of the shoulders 35 of that link with the shoulders of the next adjacent link.

The general structure of the bit carrying link, seen in Figure 3, and the chain as a whole, seen in Figure 1, without regard to the particular pin and pin fastening means, and without regard to the specific connecting link, is the invention of Nils D. Levin, and is disclosed and claimed in his application for a Cutter chain, Serial No. 729,713, filed June 8, 1934.

It will be understood that the invention is not limited to the details of construction shown in the drawing and described in the specification and that the example of the use of the invention which has been given, does not include all of the uses of which it is capable; also that the phraseology employed in the specification is for the purpose of description and not of limitation.

I claim:—

1. A cutter chain including substantially U-shaped links, alternate connecting links positioned within the U-shaped links, said links having aligned apertures, one aperture of a U-shaped link having a keyway opening therefrom, and a pintle structure coupling adjacent links, said pintle structure comprising a pin and a sleeve, the pin extending through the apertures in both of said links and the portion thereof within the connecting link aperture being surrounded by said sleeve, said sleeve having a kerf at one end thereof extending through its wall, said pin being provided of substantially constant diameter and provided at one end with a head and having a key extending longitudinally thereof from the head, the key being of sufficient length to extend through the keyway of the U-shaped link and into the kerf of said sleeve.

2. A cutter chain link having a trough-like depression extending longitudinally of the surface thereof adapted to be positioned outermost when in use, said depression being of greatest depth intermediate its ends, and having a slot opening through the wall thereof adjacent its point of greatest depth to enable slack to move from the depression.

3. A cutter chain link having apertures extending therethrough adjacent each end to enable it to be connected to adjoining links by connecting means, said link having a groove provided in one wall thereof and extending longitudinally of the link, the groove opening to each of said apertures, said groove being broadened between the apertures to assist in the movement of slack from the groove.

4. A cutter chain including substantially U-shaped links, alternate connecting links positioned within the U-shaped links, said links having aligned apertures, one aperture of a U-shaped link having a keyway opening therefrom, and a pintle structure coupling adjacent links, said pintle structure comprising a pin and a sleeve, the pin extending through the apertures in both of said links and the portion thereof within the connecting link aperture being surrounded by said sleeve, said sleeve having a kerf at one end thereof extending through its wall, said pin being provided at one end with a head and having a key extending longitudinally thereof from the head, the key being of sufficient length to extend through the keyway of the U-shaped link and into the kerf of said sleeve.

5. A cutter chain comprising bit carrying links and connecting links, the end portions of the bit carrying links overlying the connecting links and being provided with abutments arranged to contact the upper surface of the connecting links being provided with transverse inclined slots extending to the side walls thereof, the slots being positioned beneath the overlying abutments of the bit carrying links so that slack material beneath the abutments will be moved laterally and outwardly from the chain through the slots.

6. A cutter chain including links having pockets in the ends thereof and connecting links having their ends positioned within the pockets of the first type of links, the links having aligned apertures through their connected portions, one aperture of a pocketed link having a keyway opening therefrom, and a pintle structure coupling adjacent links, said pintle structure comprising a pin and a sleeve, the pin extending through the apertures in both of said links and the portion thereof within the connecting link aperture being surrounded by said sleeve, said sleeve having a kerf at one end thereof extending through its wall, said pin being provided at one end with a head and having a key extending longitudinally thereof from the head, the key being of sufficient length to extend through the keyway of the pocketed link and into the kerf of said sleeve.

ROBERT R. DUNLOP.